United States Patent [19]

Smelley et al.

[11] Patent Number: 5,523,630

[45] Date of Patent: Jun. 4, 1996

[54] WIPER AND HEADLIGHT CONTROL CIRCUIT

[76] Inventors: Thelma Smelley; Rodney McWhorter, both of 2620 Oldfield Rd., Sylacauga, Ala. 35150

[21] Appl. No.: 283,188

[22] Filed: Aug. 4, 1994

[51] Int. Cl.$^6$ .................. B60L 1/14; B60Q 1/04
[52] U.S. Cl. .................. 307/10.8; 315/83; 340/457.2
[58] Field of Search .................. 307/9.1, 10.1, 307/10.8; 361/170, 173–177; 315/83, 77, 82; 340/457.2; 318/DIG. 2

[56] References Cited

U.S. PATENT DOCUMENTS

| | | | |
|---|---|---|---|
| 3,591,845 | 7/1971 | Vanderpoel | 315/82 |
| 3,600,596 | 8/1971 | Alomatoal | 315/82 |
| 4,097,839 | 6/1978 | Lesiak | 307/10.8 |
| 4,194,175 | 3/1980 | Eklund | 315/82 |
| 4,236,099 | 11/1980 | Rosenblum | 315/83 |
| 4,337,400 | 6/1982 | Hahn | 307/10.8 |
| 5,138,183 | 8/1992 | Patterson | 307/10.8 |
| 5,202,581 | 4/1993 | Moore | 307/10.8 |
| 5,235,250 | 8/1993 | Cronk | 315/82 |
| 5,424,585 | 6/1995 | Geraghty | 307/10.8 |

Primary Examiner—William M. Shoop, Jr.
Assistant Examiner—Richard T. Elms
Attorney, Agent, or Firm—Richard C. Litman

[57] ABSTRACT

A control circuit automatically provides power to the headlights of a vehicle once the windshield wipers have been turned on if the ignition switch is also turned on. Should the headlights already be turned on once the windshield wipers are turned on, the control circuit of the present invention has no effect on the operation of the headlights. However, should the headlight switch remain on after the ignition switch is turned off, an audible alarm is produced to alert the user of the vehicle that the headlights are still on.

12 Claims, 1 Drawing Sheet

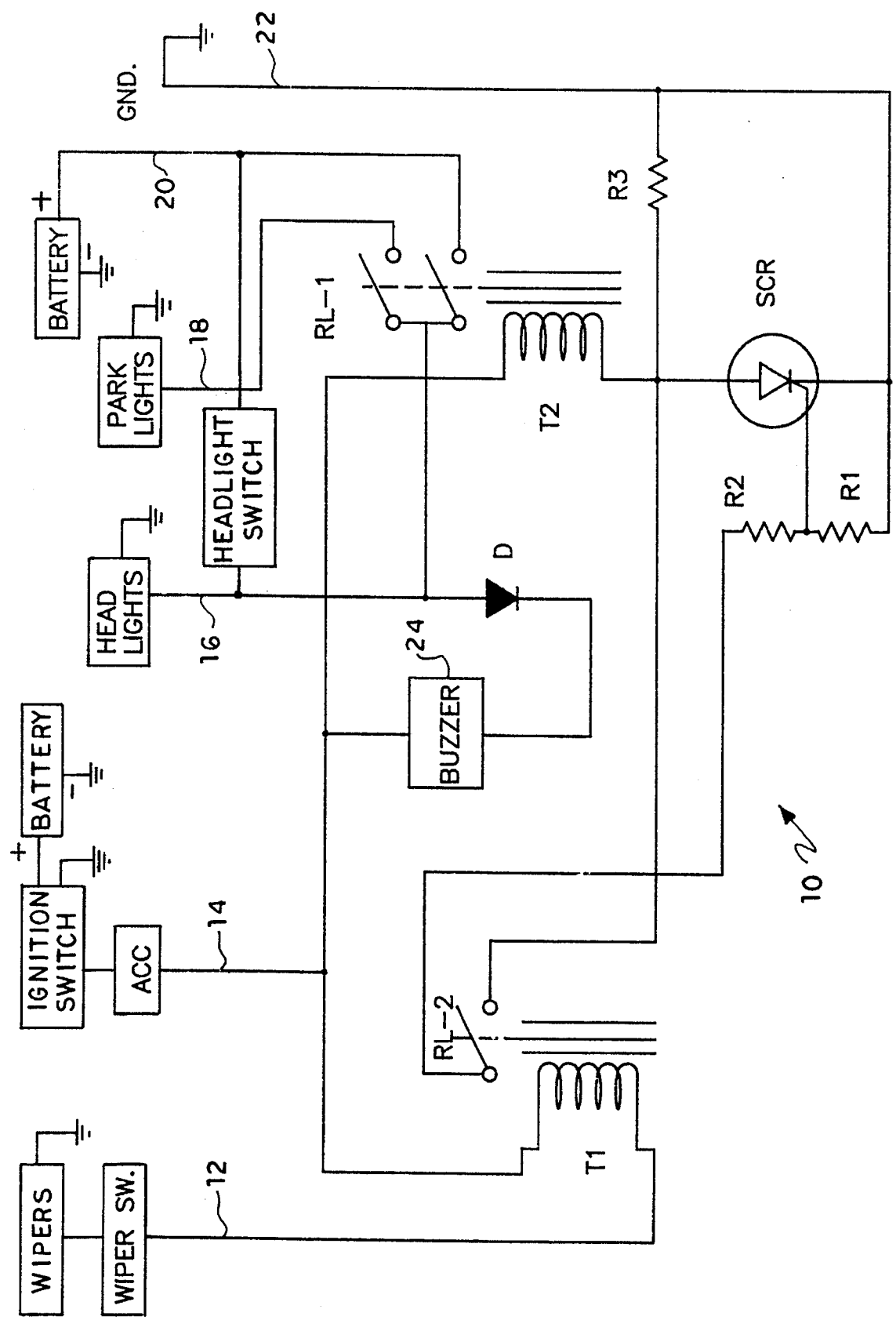

1

WIPER AND HEADLIGHT CONTROL CIRCUIT

BACKGROUND OF THE INVENTION

1. Field of the Invention

The present invention relates to a control circuit attachable to a vehicle for turning on the headlights and parking lights of a vehicle whenever the windshield are turned on by the driver with the vehicle running, further the present invention is used for providing an audible warning signal should the ignition switch be turned off with the headlight switch of the vehicle being left on.

2. Description of the Prior Art

Wiper and headlight control circuits attachable to vehicles for automatically engaging the headlights of the vehicle as soon as the windshield wipers are turned on by the user provide an additional level of road safety by insuring that the headlights are turned on when visibility is reduced due to rain. In some states it is the law that the headlights be turned on whenever it rains, reducing the visibility of the driver. Drivers are more likely to forget to turn on the headlights of a vehicle when it is raining than when it is dark, because the headlights do not provide any significant increase in road visibility. Generally, headlights in either foggy or rainy weather provide only limited additional visibility of the road to the driver in the vehicle. However, headlights do make the vehicle more visible to other drivers on the road during rainy weather.

U.S. Pat. No. 3,591,845 issued Jul. 6, 1971 to Cornellius E. Vanderpoel, Jr. discloses a headlight control circuit having a main wiper switch for providing power to a relay coil. Once the relay coil is energized, power from the main wiper switch is also provided to the windshield wipers of the vehicle as well as the headlights through a pair of normally open relay switches closed upon the activation of the relay coil.

U.S. Pat. No. 3,600,596 issued Aug. 17, 1971 to John E. Alolmatoal discloses a headlight control circuit having an ignition switch in series with the wiper switch for providing power to the windshield wipers as well as three electronic switches, each used to provide power to either the headlights, tail lights, or instrument panel lights of the vehicle once the ignition switch and wiper switch are closed.

U.S. Pat. No. 4,097,839 issued Jun. 27, 1978 to Walter J. Lesiak discloses one relay coil receiving power from the wiper switch so as to close a normally open relay switch which provides power to a variety of lights of the vehicle.

U.S. Pat. No. 4,236,099 issued Nov. 25, 1980 to Irving Rosenblum discloses logic circuitry for turning on the headlights of a vehicle, wherein the logic circuitry is responsive to a light sensor, the windshield wiper switch, the ignition switch, and a manual control switch.

U.S. Pat. No. 4,337,400 issued Jun. 29, 1982 to Thomas J. Hahn discloses a headlight control circuit having a pair of normally open relay switches, each relay switch receiving power from the battery, with one thereof providing power to the headlights and the other thereof providing power to the marker lights after the relay coil has been activated. The relay coil is connected across the ignition switch and the wiper switch such that power is provided thereto by the ignition switch only when the ignition switch and wiper switch are turned.

U.S. Pat. No. 5,138,183 issued Aug. 11, 1992 to Johnny F. Patterson discloses a headlight control circuit utilizing a relay coil to close three normally relay open switches. Once the windshield wiper switch is closed, power is supplied to the relay coil through the windshield wiper switch and a diode. One of the relay switches provides power to the parking lights when closed, another provides power to the headlights when closed, and a third provides power coming from the turned on ignition switch to the relay coil so as to maintain the relay coil energized once the wiper switch is turned on until the ignition switch is turned off.

None of the above inventions and patents, taken either singly or in combination, is seen to describe the instant invention as claimed.

SUMMARY OF THE INVENTION

The wiper and headlight control circuit of the present invention turns the headlights of the vehicle to which the control circuit is attached on if they were off upon the manual actuation of the windshield wipers by a user of the vehicle. A first relay coil is connected across the ignition switch of the vehicle and the wiper switch of the vehicle. The ignition switch provides power to the first relay coil when turned on and the wiper switch provides a ground connection to the other end of the first relay coil when turned on. The actuation of the first relay coil energizes a second relay coil which provides power to both the headlights and the parking lights. Further, a buzzer circuit is connected across the ignition switch and a hard wire connection to the headlights such that the buzzer sounds if the headlights are turned on with the ignition switch off.

Accordingly, it is a principal object of the invention to provide a control circuit for automatically turning on the headlights if the headlights are off and the windshield wipers are turned on.

It is another object of the invention to provide an audible alarm signal to the user of the vehicle if the headlights switch was left on after the ignition switch has been turned off.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The FIGURE is an electrical schematic diagram of the wiper and headlight control circuit of the present invention.

DETAILED DESCRIPTION OF THE PREFERRED EMBODIMENT

The wiper and headlight control circuit 10 of the present invention is illustrated in the FIGURE. Circuit 10 is connected to a vehicle through the use of hard wire connections 12, 14, 16, 18, 20, and 22. The hard wire connections include a connection to the wiper switch which supplies a ground connection to the circuit 10 through hard wire connection 12 upon the activation of the wipers by the user of the vehicle. A connection to the accessory portion of the ignition switch is made to hard wire connection 14 which is supplied the power from the battery of the vehicle when the ignition switch is turned on and is supplied a ground connection when the ignition switch of the vehicle is turned off. Hard wire connection 16 is connected to the line supplying power to the lower headlights from the headlight switch of the vehicle. Hard wire connection 18 is connected to the line supplying power to the park lights from the headlight switch of the vehicle. Hard wire connection 20 is connected to the battery of the vehicle and hard wire connection 22 is connected to any ground location of the vehicle. All hard wire connections may be made in any appropriate manner with the electrical circuitry of the vehicle to which the circuit 10 is attached.

With the wiper and headlight control circuit 10 connected to a vehicle as disclosed above, the headlights and the parking lights of the vehicle will come on automatically when the wipers are turned on if the headlights and parking lights are not already turned on. The ignition switch of the vehicle has to be turned on before the automatic control of the headlights and parking lights can be achieved in synchronicity with the manual activation or deactivation of the windshield wipers by the user of the vehicle. In this manner, every time the wiper switch is turned on, the parking lights and headlights are also turned on automatically if they have not already been turned on manually by the user. Also, every time the wiper switch is energized, the lights remain on until the ignition switch is turned off, unless the lights have been turned on manually. This is a safety feature which insures that the lights will not be turned off inadvertently should it start raining during daylight hours so that the headlights are not turned on manually and, later, the rains stops so that the windshield wiper switch is turned off manually after it becomes dark. Therefore, it is not necessary for the user of the vehicle to turn the lights on manually after the windshield wipers have been operated to turn the lights on automatically, thereby avoiding the danger of leaving the user in the dark with the lights off until should the user forget to turn the headlights on manually before turning the wiper switch off. Should the user of the vehicle turn the ignition of the vehicle off before manually turning off the parking lights and headlights, a buzzer sounds to indicate that these lights have been left on.

The operation of the wiper and headlight control circuit 10 as discussed above is accomplished in the following manner. A relay coil T+1 is connected across the ignition switch ACC connection and the wiper switch SW connection as discussed above. Once the ignition switch is turned on, the ACC connection provides the power from the battery to one end of the coil T1. With the wiper switch off, the wiper SW connection does not provide a ground connection to allow the coil T1 to be energized. Note also that the power from the ACC connection provide power to the relay coil T2 which is connected to ground through a resistor R3 and the GND connection. Resistor R3 has a secondary purpose, to provide a return path for the current through the buzzer 24 in the event that there is no load on the accessory side of the ignition switch. However, the value of resistance for the resistor R3 is high enough to limit the current passing through the coil T2 so that the current level necessary to energize the coil T2 does not pass therethrough.

If the wiper switch is also turned on by the user after the ignition switch has been turned on, the wiper SW connection provides a ground to the other end of the coil T1 and the normally open relay switch RL-2 is closed. The power across the ACC connection is then provided to the gate of the silicon controlled rectifier SCR. Once power is supplied to the gate of the SCR through the use of the biasing resistors R1 and R2, the SCR is activated to provide a ground connection to the end of the coil T2 opposite the end connected to the ACC connection. The current passing through the coil T2 is large enough to energize it once the SCR has been energized. The two normally open switches RL-1 of the relay are closed once the relay coil T2 is energized. In this manner, power from the BATTERY connection is provided to both the PARK LIGHTS connection and the HEAD LIGHTS connection. Thus both the parking lights and the headlights of the vehicle are turned on. Note that the SCR remains energized even after the wiper switch is turned off, thereby opening switch RL-2 and blocking the current to the gate of the SCR. In this manner, the SCR remains energized until the ignition switch is turned off.

As shown in the FIGURE, once ACC provides power from the vehicle's battery to a buzzer 24 after the ignition has been turned on as discussed above. The other end of the buzzer 24 is connected to the HEAD LIGHTS connection through the diode D. With the headlight switch off and the wiper switch off, the HEAD LIGHTS connection provides a ground connection to the control circuit 10. However, the diode D prevents current from flowing from the ACC connection through the buzzer 24 and to the headlights of the vehicle. However, should the headlights be turned on by the user via the headlight switch of the vehicle, the HEAD LIGHTS connection then provides power to the control circuit 10. With the ignition also on, voltage difference across the buzzer 24 and diode D is zero and the buzzer 24 remains mute. However should the ignition be turned off, the ACC connection would then provide a ground connection to the buzzer 24 and the power from the HEAD LIGHTS connection would be able to flow though the diode D and the buzzer 24, allowing buzzer 24 to provide an audible warning signal to the user that the headlights have been left on and after the ignition switch has been turned off. Note that leaving the parking lights on would not activate the buzzer 24.

It is to be understood that the present invention is not limited to the sole embodiment described above, but encompasses any and all embodiments within the scope of the following claims.

I claim:

1. A wiper and headlight control circuit connectable to a vehicle comprising:

a first relay coil having a first end and a second end;

a second relay coil having a first end and a second end;

a first hard wire connection connected to said second end of said first relay coil, whereby said first hard wire connection is made to a wiper switch of the vehicle upon installation of the control circuit;

a second hard wire connection connected to said first end of said first relay coil and said first end of said second relay coil, whereby said second hard wire connection is made to an ignition switch of the vehicle upon installation of the control circuit;

a normally open first relay switch closed upon the actuation of said first relay coil, said first relay switch including a first end and a second end;

a normally open second relay switch closed upon the actuation of said second relay coil, said second relay switch including a first and second end;

a third hard wire connection connected to said first end of said second relay switch, whereby said third hard wire connection is made to both headlights of the vehicle upon installation of the control circuit;

a fourth hard wire connection connected to said second end of said second relay switch, whereby said fourth hard wire connection is made to a battery of the vehicle upon installation of the control circuit;

a fifth hard wire connection made to a ground of the vehicle upon installation of the control circuit; and, means for providing a ground connection from said fifth hard wire connection to said second end of said second relay coil upon the closing of said first relay switch, whereby, after the installation of the control circuit within the vehicle, and upon the activation of the ignition switch of the vehicle so as to provide power to the second hard wire connection, the engagement of the wiper switch of the vehicle causes a ground connection to the first hard wire connection to be made thereby energizing the first relay coil and closing said first relay switch, which in turn causes the means for providing a ground connection to provide the ground connection to the second end of said second relay coil, thereby energizing the second relay coil so as to close the second relay switch, thereby providing power to the headlights of the vehicle should the headlights be off prior to the engagement of the windshield wipers of the vehicle.

2. A wiper and headlight control circuit as claimed in claim 1, wherein said means for providing a ground connection comprises a silicon controlled rectifier having a first end connected to said second end of said second relay coil, a second end connected to said fifth hard wire connection, and a gate connection for activating said silicon controlled rectifier once power is provided to said gate connection so as to provide a ground connection to said second end of said second relay coil, wherein said first end of said first relay switch is connected to said second end of said second relay coil and said second end of said second relay switch is connected to a biasing circuit, said biasing circuit being connected to said gate connection for activating silicon controlled rectifier once said second relay switch is closed.

3. A wiper and headlight control circuit as claimed in claim 2, wherein said biasing circuit includes a pair of resistors, a first resistor thereof connected between said second end of said first relay switch and said gate connection, and a second resistor thereof connected between said gate connection and said fifth hard wire connection.

4. A wiper and headlight control circuit as claimed in claim 1, further comprising:

a diode having a first end for allowing current to pass therethrough to a second end while prevent current from passing from said second end to said first end, said first end thereof being connected to said third hard wire connection; and a buzzer circuit having a first end and a second end, wherein said first end thereof is connected to said second hard wire connection and said second end thereof is connected to said second end of said diode, whereby said buzzer is activated by power supplied to said third hard wire connection leading to the headlights once the ignition switch is turned off so as to provide a ground connection to said second hard wire connection.

5. A wiper and headlight control circuit as claimed in claim 2, further comprising:

a diode having a first end for allowing current to pass therethrough to a second end while prevent current from passing from said second end to said first end, said first end thereof being connected to said third hard wire connection; and a buzzer circuit having a first end and a second end, wherein said first end thereof is connected to said second hard wire connection and said second end thereof is connected to said second end of said diode, whereby said buzzer is activated by power supplied to said third hard wire connection leading to the headlights once the ignition switch is turned off so as to provide a ground connection to said second hard wire connection.

6. A wiper and headlight control circuit as claimed in claim 3, further comprising:

a diode having a first end for allowing current to pass therethrough to a second end while prevent current from passing from said second end to said first end, said first end thereof being connected to said third hard wire connection; and a buzzer circuit having a first end and a second end, wherein said first end thereof is connected to said second hard wire connection and said second end thereof is connected to said second end of said diode, whereby said buzzer is activated by power supplied to said third hard wire connection leading to the headlights once the ignition switch is turned off so as to provide a ground connection to said second hard wire connection.

7. A wiper and headlight control circuit as claimed in claim 1, further comprising:

a normally open third relay switch having a first end and a second, said third relay switch being closed upon the activation of said second relay coil, said first end of said third relay switch connected to said third hard wire connection; and a sixth hard wire connection made to any parking lights of the vehicle, said sixth hard wire connection being connected to said second end of said third relay switch.

8. A wiper and headlight control circuit as claimed in claim 2, further comprising:

a normally open third relay switch having a first end and a second, said third relay switch being closed upon the activation of said second relay coil, said first end of said third relay switch connected to said third hard wire connection; and a sixth hard wire connection made to any parking lights of the vehicle, said sixth hard wire connection being connected to said second end of said third relay switch.

9. A wiper and headlight control circuit as claimed in claim 3, further comprising:

a normally open third relay switch having a first end and a second, said third relay switch being closed upon the activation of said second relay coil, said first end of said third relay switch connected to said third hard wire connection; and a sixth hard wire connection made to any parking lights of the vehicle, said sixth hard wire connection being connected to said second end of said third relay switch.

10. A wiper and headlight control circuit as claimed in claim 4, further comprising:

a normally open third relay switch having a first end and a second, said third relay switch being closed upon the activation of said second relay coil, said first end of said third relay switch connected to said third hard wire connection; and a sixth hard wire connection made to any parking lights of the vehicle, said sixth hard wire connection being connected to said second end of said third relay switch.

11. A wiper and headlight control circuit as claimed in claim 5, further comprising:

- a normally open third relay switch having a first end and a second, said third relay switch being closed upon the activation of said second relay coil, said first end of said third relay switch connected to said third hard wire connection; and
- a sixth hard wire connection made to any parking lights of the vehicle, said sixth hard wire connection being connected to said second end of said third relay switch.

12. A wiper and headlight control circuit as claimed in claim 6, further comprising:

- a normally open third relay switch having a first end and a second, said third relay switch being closed upon the activation of said second relay coil, said first end of said third relay switch connected to said third hard wire connection; and
- a sixth hard wire connection made to any parking lights of the vehicle, said sixth hard wire connection being connected to said second end of said third relay switch.

* * * * *